Patented July 24, 1928.

1,677,947

UNITED STATES PATENT OFFICE.

OSCAR L. BARNEBEY, OF COLUMBUS, OHIO.

REVIVIFYING OF SPENT DECOLORIZING MATERIALS.

No Drawing. Application filed April 12, 1924, Serial No. 706,100. Renewed March 15, 1928.

This invention relates to materials serving as refining agents or decolorizers in the treatment of liquids and to methods of refining or decolorizing the liquids.

Among the objects of this invention is to provide a composition for refining or decolorizing liquids, preferably organic liquids such as sugar solutions and syrups, vegetable oils, pharmaceuticals, chemicals, mineral oils and the like, which decolorizing composition may be readily recovered and revivified for further use after it has become spent or exhausted in the process.

A further object of this invention is to provide a process for treating liquids of the character heretofore described by means of these decolorizing and refining agents.

A still further object of this invention is to provide a process for treating the spent or exhausted decolorizing material after it has been used in one or more treatments of the liquids and to regenerate or revivify the refining and decolorizing properties possessed by the agent before its use as a decolorizer.

Other, further and more specific objects of this invention will become readily apparent to persons skilled in the art from a consideration of the following description.

In refining such materials as sugar and sugar syrups, vegetable oils, etc., the finely divided decolorizing carbons on the market usually require the use of a material like kieselguhr, sil-o-cel or other silicious materials to assist in filtration. When the carbons are used without some assisting material of this type the carbons tend to clog the filters and give other mechanical troubles. Silicious materials of this type, however, have the very serious handicap of diluting the carbon and this is objectionable. if the carbon is to be revivified and used over again one or more times. This addition of more silicious material to the used carbon to further aid in filtration lessens the carbon content to a very material extent and the silicious matter is cumulative, finally requiring the carbon to be discarded altogether, resulting in much loss.

I have found that the effect accomplished with kieselguhr, sil-o-cel and other silicious materials can be produced with cellulose fibre material, such as soda pulp made in the ordinary process of manufacture of paper by the soda process in the ordinary soda pulp mill. Not only do I find that the same effect can be accomplished with fibre of this type, but indeed a much superior filtration can be obtained.

Further, I have found that the used carbon-paper pulp mixture can be reconverted into valuable decolorizing carbon practically free from inert material and very valuable for refining of sugar and other substances as well, as will appear from my process hereinafter described.

In carrying out my process, the paper pulp or similar cellulose fibre material is preferably mixed with the sugar liquor, vegetable oil, glycerine or other material being refined. The paper is stirred thoroughly with the liquor or other substances, thus contacting the entire mass with the fibres of the paper and at the same time thoroughly breaking up the fibres to give good admixture with solutions being refined. After thorough agitation of the paper pulp with sugar liquors or similar liquids being refined, high grade finely divided decolorizing carbon is added and likewise stirred thoroughly with the material, thus producing an intimate mixture of decolorizing carbon and paper pulp along with any filterable impurities in suspension with the sugar liquor.

The mixture of paper pulp and carbon is now passed through a filter press which has been precoated with paper pulp so that the leaves of the press are covered with a thin, uniform layer of pulp, and after the mixture is in the press the solid press cake is washed thoroughly to remove any sugar therefrom. After thorough washing other batches of sugar liquor can be thrown upon the same filter press leaves until the press cake has been built up to such a thickness as to make further addition of paper-carbon cake impracticable, at which time the thoroughly washed cake is removed from the filter press and used with subsequent batches of sugar liquor for several times until the carbon has had its refining power diminished beyond the state of minimum efficiency or until it is no longer practical to use it further.

In these subsequent treatments of new batches of sugar liquor it is seldom necessary to add but small additional amounts of paper pulp. In fact, frequently none whatever is added. The filter presses, however, are best precoated with paper pulp for each filtration as this prevents the filter cloth from becoming plugged up with finely divided carbon mixture.

When the carbon has become essentially exhausted or spent and has been thoroughly washed, the mass is dried. The dried mass is then treated to restore the original decolorizing power of the decolorizing carbon and also to convert the paper pulp into additional decolorizing carbon for future use. To accomplish this, the dried mass is introduced into a rotary furnace which is heated both externally and internally in such a manner as to give a maximum temperature between 700 and 1100° C., and of this range the temperatures between 800 and 900° C. is preferred. The entrance end of the furnace is heated to give an application of approximately 400 to 800° C., the temperature gradually increasing until the zone is reached giving an application of 700 to 1100° C. as final treatment. Upon heating the decolorizing carbon-paper pulp mixture the first effect is to char or carbonize the paper pulp, the paper being decomposed and converted into carbonaceous material. Also the saccharine materials as well as phenols, tannins, etc. subtracted from the sugar liquors are also decomposed by the heat, thus producing additional carbonaceous material. This carbonizing takes place at temperatures of about redness, that is to say, between 400 and 800° C.

After this carbonizing is completed in the furnace and the temperature rises in the hotter zone of the furnace to 700 to 1100° C., the carbonized material undergoes a second treatment by contact of same with gaseous products of combustion, namely carbon dioxide and water, hereinafter called "oxygenated gases." Additional water in the form of steam or superheated steam is likewise added at times although not always necessary. These products of combustion at the temperatures enumerated, namely 700 to 1100° C., serve as mild oxidizing agents and react with the carbonized mass and remove any tarry materials produced by carbonization and further react with the carbon itself to open up the pores of the same, thus producing a very reactive carbon material.

Air can be used in small limited amounts, and if used in a controlled manner can be caused to oxidize the impurities and revivify the spent carbon as well as produce decolorizing properties in the charcoal. Care must be exercised in using air, since an excess of air will consume the entire carbon content. The temperatures for using air are upwards from about 300° C.

The decolorizing carbon after treatment is discharged from the furnace into coolers and from the coolers is discharged subsequently into steel drums. This carbon is then ready to be used again for refining operations and to this end is again mixed with fresh paper pulp to aid filtration, stirring the paper pulp and carbon materials together with the material being refined, filter pressing, washing, drying, treating, etc., in a cyclic manner, thus using the carbon over and over again, time after time.

If a considerable quantity of filter paper is used it is not necessary to add any further quantities of decolorizing carbon, provided the process is regulated well and mechanical losses are not too great. In the ordinary case, however, small quantities of the decolorizing carbon are added from time to time.

In following my process the only diluting matters which can contaminate the decolorizing carbon are the inorganic substances which the carbon takes up from the sugar liquor or similar material being refined, and occasionally it is desirable to treat the decolorizing carbonaceous mass with a mineral acid to remove such mineral matter. This is done by treating the carbon with hydrochloric acid, sulphuric acid, or phosphoric acid. In this relation, I ordinarily prefer to use hydrochloric acid. After treatment with acid, if residual acid is objectionable or detrimental to the use for which the revivified carbon is to be put, the acid must be thoroughly washed out, previous to use of the carbon, otherwise impurities will be introduced into the liquid being refined and cause detrimental effects. The carbon is again heated to remove moisture and any remaining volatile acid.

A specific example of carrying out my invention is as follows: 1000 pounds of 96 test raw sugar is dissolved in water to produce a 60% sugar liquor. The sugar liquor is heated to approximately 180° F. and to the hot liquor is added 5 pounds of paper pulp fibre and 20 pounds of high grade decolorizing carbon. The pulp and carbon are thoroughly stirred with the liquor for about 20 minutes. In the meantime, the filter press leaves are precoated with a layer of paper pulp, about $\frac{1}{16}$ to $\frac{1}{8}$ inch thick. The sugar liquor is then filtered. The residue is removed from the filter press and added to a new batch of sugar liquor. This operation is repeated four or five times without the addition of more paper pulp, except to coat the filter presses, after which the carbon pulp mixture is washed thoroughly, dried, carbonized at temperatures between 400° and 800° C., followed by treatment with oxygenated gases at temperatures between 800 and 900° C., which operation revivifies the original decolorizing carbon and also manufactures more decolorizing carbon from the paper pulp for future refining operations.

After the sugar liquors are refined by the carbon-cellulose fibre operation the clear decolorized sugar liquors are evaporated, the sugar crystallized, centrifuged, dried and packed or barreled in the usual manner to produce white granulated sugar or the sugar liquor is sold for edible syrup without conversion of the sugar to the solid state.

Sometimes I prefer to pump the hot sugar liquors through the filter presses without removing the press cake and continue passing the liquor through the press cake until the carbon has had its refining power essentially used up, after which the carbon pulp cake is removed from the press, dried, carbonized, and treated with oxygenated gases as above described, to restore and produce more decolorizing carbon.

While the example given above is that of refining sugar and sugar liquors the process is not limited to this particular refining operation but on the contrary the process can be used for refining other materials in solution as well as mineral oils, vegetable oils, pharmaceuticals, chemicals and the like, the example being given to illustrate one of the most valuable of the applications of the invention and which is typical of the general application and use of the same.

From the foregoing descriptions it is to be seen that a three fold operation is involved in my process. First of all, I use cellulose fibre materials to aid filtration with decolorizing carbon. Second, I restore the original value of decolorizing carbon, and third, I actually manufacture decolorizing carbon from the cellulose fibre in the process of revivifying the previously used carbon and by virtue of the use of paper pulp for aid in the filtration I manufacture a very high grade decolorizing carbon containing very little diluent material, in fact, only such diluent material as has been subtracted by the refining operation itself.

In carrying out the refining operation I prefer to use only high grade decolorizing carbon and cellulose material which by nature of my process is converted into decolorizing carbon, all of which materials are uncontaminated with diluent minerals or other similar material. In consequence of this I accomplish a much better refining operation and further I accomplish the entire operation or refining in an improved manner since the mechanical operation is much easier to manipulate than the usual process of refining using decolorizing carbon along with kieselguhr and other mineral materials of similar nature.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A composition for decolorizing liquids comprising the charred and activated product of a mixture of decolorizing carbon and cellulose fibre.

2. A composition for decolorizing liquids comprising the charred and activated product of a mixture of decolorizing carbon and paper pulp.

3. In a process of revivifying a spent mixture of decolorizing carbon and cellulose fibres which has been used in clarifying liquids, charring the spent mixture and then activating the charred product by heating in the presence of a mild oxidizing agent.

4. In a process of revivifying a spent mixture of decolorizing carbon and cellulose fibers which has been used in clarifying liquids, charring the spent mixture and activating the charred product by heating at temperatures of 700–1100° C. in the presence of oxygenated gases.

5. In a process of revivifying a spent mixture of decolorizing carbon and cellulose fibers which has been used in clarifying liquids, charring the spent mixture and activating the charred product by heating at temperatures of 700–1100° C. in the presence of steam.

6. In a process of revivifying a spent mixture of decolorizing carbon and paper pulp which has been used in clarifying liquids, charring the spent mixture and then activating the charred product by heating at a temperature above that required for charring and in the presence of a mild oxidizing agent.

7. In a process of revivifying a spent mixture of decolorizing carbon and cellulose fibres which has been used in clarifying liquids, charring the spent mixture at temperatures of 400–800° C. and then activating the charred product by heating at 700–1100° C. in the presence of a mild oxidizing agent.

8. In a process of revivifying a spent mixture of decolorizing carbon and cellulose fibres which has been used in clarifying liquids, charring the spent mixture and then activating the charred product by heating in the presence of a mild oxidizing agent and then treating the activated material with a mineral acid.

9. In a process of revivifying a spent mixture of decolorizing carbon and cellulose fibres which has been used in clarifying liquids, charring the spent mixture and then activating the charred product by heating in the presence of a mild oxidizing agent, treating the activated material with a mineral acid and then washing the excess acid therefrom.

10. In a process of revivifying a spent mixture of decolorizing carbon and cellulose fibres which has been used in clarifying liquids, charring the spent mixture and then activating the charred product by heating in the presence of a mild oxidizing agent, treating the activated material with a mineral acid, washing the excess acid therefrom and then removing moisture and traces of acid remaining in the activated material by heating said material.

In testimony whereof, I hereunto affix my signature.

OSCAR L. BARNEBEY.